United States Patent [19]

Pike

[11] Patent Number: 4,633,727
[45] Date of Patent: Jan. 6, 1987

[54] MOTORCYCLE AUXILIARY GEARSHIFT

[76] Inventor: Carl D. Pike, 45515 S.E. Tanner Rd., North Bend, Wash. 98045

[21] Appl. No.: 709,128

[22] Filed: Mar. 7, 1985

[51] Int. Cl.$^4$ ............................................. B60K 23/00
[52] U.S. Cl. ................................... 74/474; 74/478.5; 74/512; 74/562.5; 180/293; 180/294
[58] Field of Search ................. 74/474, 479, 512, 560, 74/562.5, 562, 478.5; 180/230, 293, 294, 332, 336

[56] References Cited

U.S. PATENT DOCUMENTS

| | | | |
|---|---|---|---|
| 3,207,276 | 2/1965 | David et al. | 74/560 |
| 3,919,896 | 11/1975 | Foster | 74/474 |
| 4,061,051 | 12/1977 | Grandis | 74/474 |
| 4,093,264 | 6/1978 | Ishihara et al. | 180/230 X |
| 4,312,246 | 1/1982 | Barresi | 74/562.5 |

Primary Examiner—Albert J. Makay
Assistant Examiner—Steven E. Warner

[57] ABSTRACT

An auxiliary foot actuated gearshift for a motorcycle is disclosed wherein an independent pivot shaft is established at the near midpoint location of the auxiliary gearshift lever in such a manner so that downward pressure on the auxiliary gearshift at the pedal (outboard) end causes an upward pressure on the opposite (inboard) end which rests against the under side of the existing gearshift lever. This action pushes the existing gearshift up and allows the operator to shift from the low range of gears to the high range of gears by applying downward pressure on the auxiliary gearshift. Since the original existing gearshift has not been altered by the installation of the auxiliary gearshift, shifting from the high range of gears to the low range of gears is accomplished by downward pressure on the original existing gearshift. All shifting therefore can be accomplished by downward pressure on either the existing or the auxiliary gearshift.

4 Claims, 4 Drawing Figures

MOTORCYCLE AUXILIARY GEARSHIFT

BACKGROUND OF THE INVENTION

Most modern motorcycles are produced with a gearshift mechanisim which includes a foot pedal which requires downward pressure by the bottom of the toe of the foot and upward pressure by the top of the toe. The rider's foot is normally placed on the foot rest so that the heel or instep is on the rest. The gearshift pedal is positioned in front of the foot rest where the rider can either apply pressure to the top of the pedal or rotate his foot down under the pedal and lift up on the pedal.

Although the motorcycle gearshift has been very successful, and relatively trouble free, it is not without fault and does have some undesirable traits. Although it is not a frequent occurance, it is possible on some motorcycles for the operator's toe to come into contact with the riding surface if the operator moves his foot to the under side of the shifting pedal to accomplish a shift while he is leaning in a turn. Further, the frequent pulling up on the gearshift with the upper surface of the toe of the rider's shoe can and does cause severe scuffing and marring of the rider's shoe, and even irritation to the rider's foot.

SUMMARY OF THE INVENTION

Briefly described, the present invention comprises an auxiliary foot operated gearshift for motorcycles which will convert the downward applied force into upward force on the existing gearshift thereby allowing all shifting to be accomplished by applying a downward force either on the existing gearshift or on the auxiliary gearshift.

Therefore, it is the object of the present invention to provide a foot actuated auxiliary gearshift which allows all shifting to be in the downward direction and which is inexpensive to produce and convenient to use.

Other desireable features of the present invention will become apparent upon examination of the accompanying drawing and reading of the following specification.

DETAILED DESCRIPTION

Figure 1:
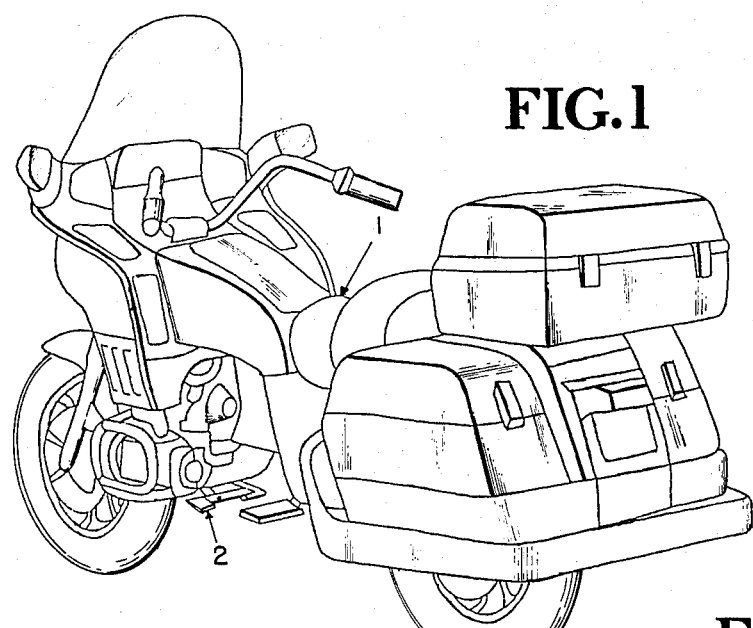
FIG. 1 illustrates a motorcycle on which the auxiliary gearshift of the present invention has been included.
Figures 2, 3, 4:
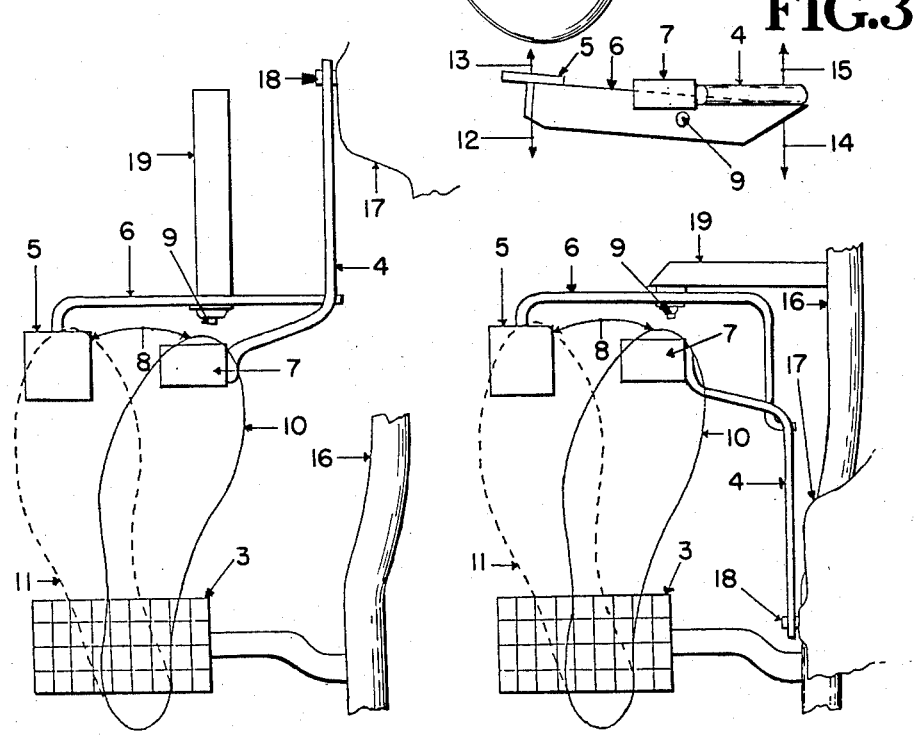
FIG. 2 is an overhead view of the auxiliary gearshift installation which shows the relationship between the foot rest, the existing gearshift pedal and the auxiliary gearshift pedal and also illustrates the foot movement required to operate the auxiliary gearshift.
FIG. 3 is a forward looking view of the auxiliary gearshift mechanism which shows the pivitol action of the auxiliary gearshift.
FIG. 4 shows an alternate installation of FIG. 2 when the existing gearshift lever extends rearward from the pedal. All functions and operations are the same as illustrated in FIG. 2.

Referring to the drawing in detail, like numbers indicate functionally like parts throughout the several views. FIG. 1 shows a modern motorcycle 1 which includes an auxiliary gearshift assembly 2. FIG. 2 and FIG. 4 show the two basic gearshift configurations of the modern motorcycle. FIG. 2 shows the configuration in which the gearshift lever 4 extends rearward from the transmission shaft 18 to the gearshift pedal 7. FIG. 4 shows the configuration in which the gearshift lever 4 extends forward from the transmission shaft 18 to the gearshift pedal 7.

As illustrated in FIG. 2 and FIG. 4, the auxiliary gearshift lever 6 is attached to a mounting bracket 19 on a pivot shaft 9. The mounting bracket 19 is attached to either the engine case 17 or the frame 16 depending on the make and model of motorcycle. Attachment of the mounting bracket 19 is accomplished by the use of existing bolts, or by clamps, or by a combination thereof.

The operator normally places his foot on the foot rest 3 so that the heel or instep portion of the foot is on the rest 3. Shifting is accomplished by applying downward pressure with the toe on either the existing gearshift pedal 7 or the auxiliary gearshift pedal 5 depending on the desired gear. The foot is rotated from foot position 10 to foot position 11 and vice versa through the horizontal pivotal arc 8.

FIG. 3 illustrates the functional operation of the motorcycle shifting operation. Starting from the neutral position, downward pressure 14 on the existing gearshift pedal 7 places the motorcycle in first gear; downward pressure 12 on the auxiliary gearshift pedal 5 moves the opposite end of the auxiliary gearshift lever 6 (which is resting below and against the existing gearshift lever 4) in the upward 15 direction and causes the motorcycle to be shifted from first gear to second gear. Successive identical actions causes the motorcycle to be shifted to successively higher gears. To shift from the higher gears to a lower gear, the operator applies downward pressure 14 on the existing gearshift pedal 17. Successive identical actions causes the motorcycle to be shifted to successively lower gears. As downward shifting pressure is applied to the existing gearshift pedal 7, the auxiliary gearshift pedal 5 travels in the upward direction 13. The auxiliary gearshift pedal 5 and the auxiliary gearshift lever 6 merely follow the movement of the existing gearshift lever 4 since the auxiliary gearshift lever 6 is resting against the under side of the existing gearshift lever 4. The auxiliary gearshift lever 6 is not attached to the existing gearshift lever 4 and maintains its position due to the over-center weight relative to the pivot shaft 9.

It will be understood that, although specific embodiments of the invention have been described for purposes of illustration, various modifications and adaptations thereof may be made without departing from the spirit and scope of the invention as defined by the following claims.

I claim:

1. A foot actuated auxiliary gearshift mechanism for a motorcycle comprising:
   a mounting bracket for attaching the auxiliary gearshift to a motorcycle;
   an auxiliary gearshift lever including a pedal at one end and means for contacting the underside of an existing gearshift lever at its opposite end;
   a pivot shaft for attaching said gearshift lever between its ends to said mounting bracket;
   said lever being attached to said mounting bracket by said pivot shaft generally perpendicular to the existing gearshift lever;
   said lever pivoting on said pivot shaft in such a manner as to cause upward movement of the existing gearshift by said contacting means when downward movement on said pedal is effected by an operator.

2. The auxiliary gearshift of claim 1 which is fabricated in such a manner as to produce a toe pad at said one end of said gearshift lever.

3. The auxiliary gearshift of claim 1 which maintains its relationship to the existing gearshift due to the over-center weight differential between said opposite end and said one end of the auxiliary gearshift.

4. The auxiliary gearshift of claim 1 which is independent of the existing gearshift and which allows the existing gearshift to function normally without interference from the auxiliary gearshift.

* * * * *